United States Patent Office 3,717,769
Patented Feb. 20, 1973

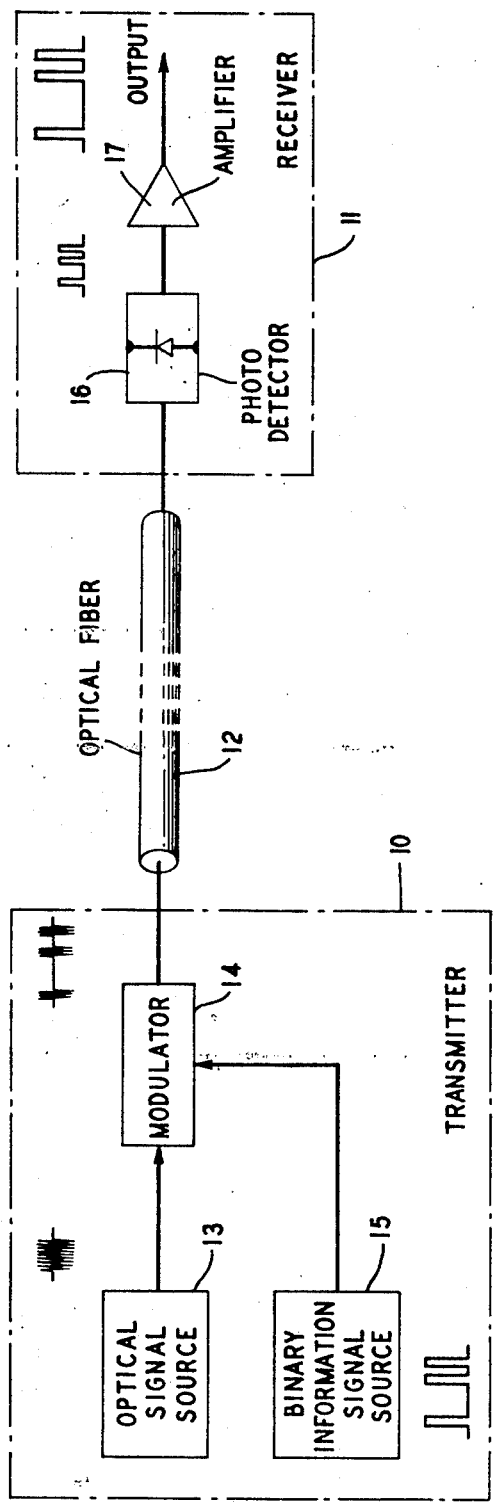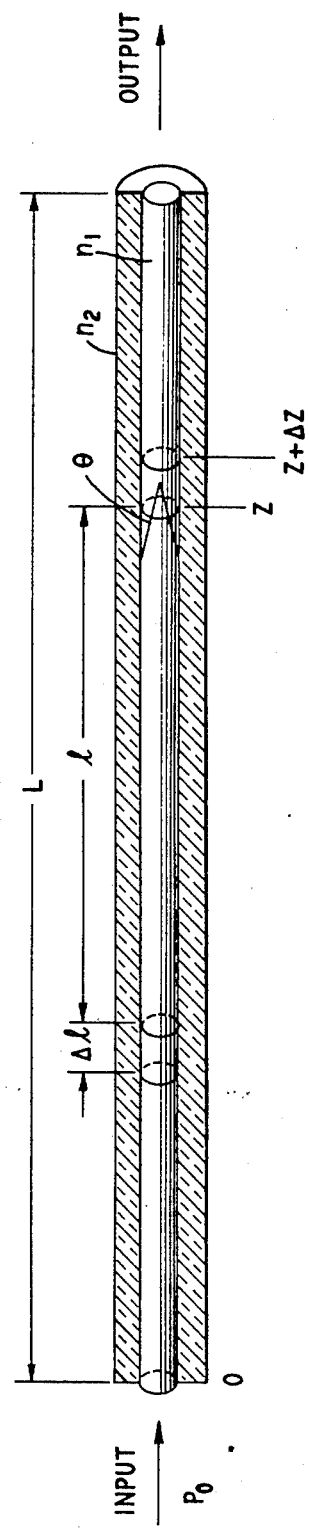

3,717,769
OPTICAL FIBER EQUALIZER

William Marshall Hubbard, Colts Neck Township, Monmouth County, and Tingye Li, Rumson, N.J., assignors to Bell Telephone Laboratories, Incorporated, Murray Hill and Berkeley Heights, N.J.
Filed Aug. 16, 1971, Ser. No. 171,984
Int. Cl. H04b 9/00
U.S. Cl. 250—199               5 Claims

ABSTRACT OF THE DISCLOSURE

Because of imperfections in optical fibers, light propagating therealong is continuously being scattered and rescattered. Some of this scattered energy is trapped within the fiber in a propagating mode and ultimately reaches the output of the fiber delayed relative to the input signal. It is shown that the double-reverse scattering response of a fiber is very nearly the same as the response of an R-C integrator for the same input. Accordingly, the effects of double-reverse scattering interference can be substantially reduced by passing a portion of the received signal through an R-C integrator and injecting the integrated signal thus produced back into the main signal path in time coincidence with the signal so as to cancel the interference component.

---

This application relates to equalizers for use in optical communication systems employing optical fibers as light guides.

BACKGROUND OF THE INVENTION

One of the several forms of transmission medium proposed for use in optical communication systems is the optical fiber. The fibers envisioned for use in such a system can be clad or unclad, and might have attenuation of the order of 10 to 30 db per kilometer. This loss results in part from absorption of the light by impurity ions in the fiber, and in part from scattering. While the absorption loss can, in principle, be made arbitrarily small, the scattering loss cannot.

Recent measurements on the lowest loss fibers currently available have shown that the absorption loss and the scattering loss are, in some cases, of the same order of magnitude (i.e., of the order of 10 db/km. each). While the lower limit (set by Rayleigh scattering) amounts to only a few db/km. at $\lambda = 0.9$ $\mu$m., imperfections in the fiber also contribute to scattering loss. Hence, it is anticipated that the dominant loss in optical fibers will be due to scattering.

The light energy lost through absorption is, of course, lost forever, but a fraction of the light "lost" by scattering eventually finds its way to the receiver by a process called "double-reverse scattering" (DRS). This process operates as follows. Some fraction of the light, which is scattered at a point along the fiber, is scattered backwards in such a manner that it is trapped by the fiber in a propagating mode. This light, as it travels back towards the transmitter, undergoes a second, reverse scattering such that a fraction is again trapped in the fiber, propagating once again in its original direction towards the receiver. However, this double-reverse scattered light is, of course, considerably delayed, arriving at the receiver some time after the original signal.

It can be shown that under certain reasonable conditions, the DRS light is only a few db below the received signal power, giving rise to an appreciable interference signal.

It is, accordingly, the broad object of this invention to reduce the effect of DRS interference.

SUMMARY OF THE INVENTION

The present invention is based upon the discovery that the DRS response of an optical fiber is identical to the response of an R-C integrator circuit for the same input. Thus, in accordance with the present invention, the received signal is corrected by passing a portion of the detected signal through an equalizer comprising an R-C integrator, and injecting the integrated signal thus produced back into the main signal path in time coincidence with the signal so as to cancel the distortion component introduced by double-reverse scattering.

It is an advantage of the invention that the amplitude of the DRS signal in the received signal can be reduced by an order of magnitude or more.

These and other objects and advantages, the nature of the present invention, and its various features, will appear more fully upon consideration of the various illustrative embodiments now to be described in detail in connection with the accompanying drawings.

BRIEF DESCRIPTION OF THE DRAWINGS

FIG. 1 shows, in block diagram, an optical communication system including an optical fiber transmission line;

FIG. 2 shows the optical fiber transmission line of FIG. 1; and

DETAILED DESCRIPTION

Figure 3:
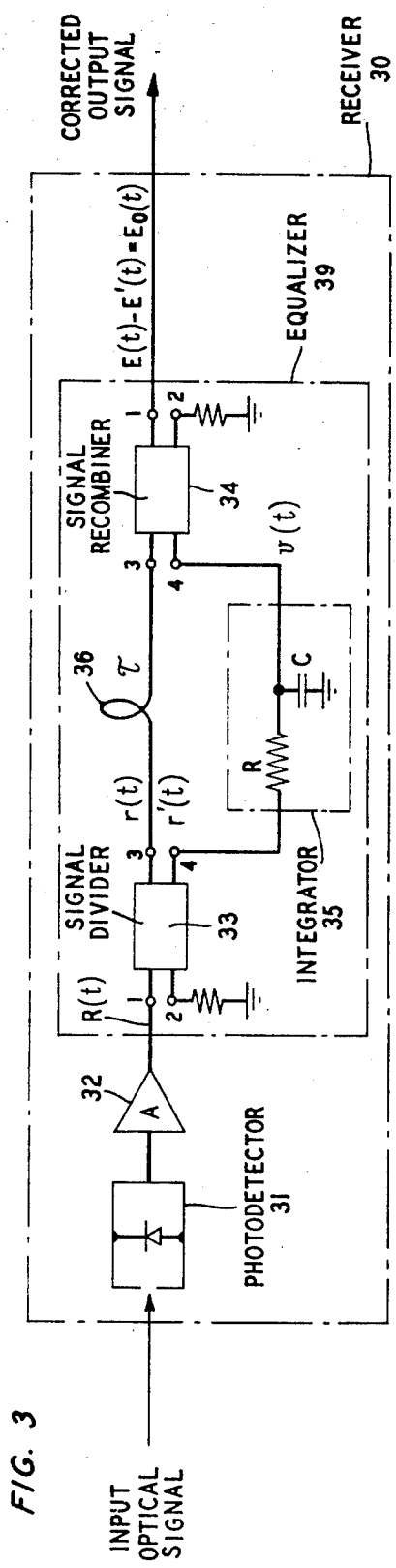
FIGS. 3 and 4 show two arrangements for reducing the interference produced by double-reverse scattering along the optical fiber transmission line shown in FIG. 2.

Referring to the drawings, FIG. 1 shows, in block diagram, an optical communication system comprising a transmitter 10 and a receiver 11 linked together by means of an optical fiber transmission line 12. Typically, transmitter 10 includes an optical signal source 13 whose output is coupled to a modulator 14 along with a modulating information signal. For purposes of illustration, the modulating signal is a pulse-encoded signal derived from a binary information signal source 15.

The pulsed optical signal derived from modulator 14 is directed along fiber 12 to a photodetector 16 in receiver 11 wherein the modulation signal is recovered. The latter is then amplified in an amplifier 17 to produce an output signal.

In the absence of double-reverse scattering, the received signal is a reasonable replica of the transmitted signal and is shown as such in FIG. 1. In fact, however, the DRS energy adds a spurious component which significantly distorts the received signal, as will now be described in connection with FIG. 2.

FIG. 2 shows a fiber of length L to which there is applied a steady input light power $P_0$. If $\alpha_s$ and $\alpha_a$ are the scattering loss coefficient per unit length, and the absorption loss coefficient per unit length, respectively, the unscattered light power $p(z)$ at any arbitrary distance $Z$ along the fiber is given by $$p(z) = P_0 e^{-(\alpha_s + \alpha_a)z} = P_0 e^{-\alpha z} \qquad (1)$$

where $\alpha = \alpha_s + \alpha_a$.

The power scattered by the incremental portion of fiber $\Delta Z$ is then $$P_0 e^{-\alpha z}(1 - e^{-\alpha_s \Delta Z}) \qquad (2)$$

Of this total power, only a fraction $f$ is trapped in the fiber in a guided mode having a reverse direction of propagation. Thus, the single-reverse scattered power $p_{SRS}$ at point Z is given by $$p_{SRS}(Z) = P_0 e^{-\alpha z}(1 - e^{-\alpha_s \Delta Z})f \qquad (3)$$

This power propagates back along the fiber a distance $l$ where it experiences a second scattering over the interval $\Delta l$. Assuming an equal fraction $f$ of the scattered power is trapped in the fiber, propagating, once again, in the forward direction, the double-reverse scattered power $p_{DRS}(l)$ at point $l$ is $$p_{DRS}(l) = P_0 e^{-\alpha Z}(1-e^{-\alpha_s \Delta Z})f e^{-\alpha l}(1-e^{-\alpha_s \Delta l})f \quad (4)$$

Taking into account the added loss traveling from the second scattering center to the fiber output end, the incremental double-reverse scattered power reaching the receiver is $$p_{DRS} = P_0 e^{-\alpha Z}(1-e^{-\alpha_s \Delta Z})f e^{-\alpha l}(1-e^{-\alpha_s \Delta l}) \\ f e^{-\alpha(l+L-Z)} \quad (5)$$

The total double-reverse scattered power $P_{DRS}$ is given by the double integral $$P_{DRS} = P_0 e^{-\alpha L} \cdot \alpha_s^2 f^2 \int_0^L \int_0^Z e^{-2\alpha l} dl dZ \quad (6)$$

which integrates to $$P_{DRS} = P_0 e^{-\alpha L} \cdot \frac{\alpha_s^2}{4\alpha^2} f^2 (2\alpha L - 1 + e^{-2\alpha L}) \quad (7)$$

Typically, repeater stations will be spaced apart a distance L such that the signal attenuation between stations is between 30 and 60 db. In such cases $$2\alpha L \gg 1 \gg e^{-2\alpha L} \quad (8)$$

and Equation 7 reduces to $$P_{DRS} = S \cdot p_S \quad (9)$$

where $$S = \frac{\alpha_s^2}{2\alpha} f^2 L \quad (10)$$

and $$p_S = P_0 e^{-\alpha L} \quad (11)$$

In order to get some idea of the magnitude of the DRS power, S is approximated for the case of a highly multimode fiber with isotropic scattering.

Referring again to FIG. 2, the complement of the critical angle, $\theta$, for total internal reflection at the interface between the core and the cladding of the fiber is given by $$\cos \theta = \frac{n_2}{n_1} \quad (12)$$

where $n_1$ is the refractive index of the core; and
$n_2$ is the refractive index of the cladding.

The solid angle $\Omega$ subtended by a right circular cone with apex angle $2\theta$ is $$\Omega = 4\pi \sin^2\left(\frac{\theta}{2}\right) = 2\pi\left(\frac{n_1-n_2}{n_1}\right) \quad (13)$$

The fraction of the light $f$ trapped within the fiber is then $$f = \frac{\Omega}{4\pi} = \frac{1}{2}\left(\frac{n_1-n_2}{n_1}\right) \quad (14)$$

Substituting (14) in Equation 10 gives $$S = \frac{\alpha_s^2}{8\alpha}\left(\frac{n_1-n_2}{n_1}\right)^2 L \quad (15)$$

Since, in a high quality fiber the dominant loss is the unavoidable Rayleigh scattering, we can set $\alpha_s \approx \alpha$, and (15) reduces to $$S = \frac{\alpha L}{8}\left(\frac{n_1-n_2}{n_1}\right)^2 \quad (16)$$

As an example, we assume a 30 db loss such that $\alpha L = 6.9$, and an unclad fiber ($n_2=1$) of refractive index $n_1 = 1.5$. For this case $$S = \frac{6.9}{8} \cdot \left(\frac{1.5-1}{1.5}\right)^2 \approx 0.1$$

Substituting this value in Equation 9, we observe that the double-reflected scattered power $P_{DRS}$ is only 10 db down from the signal power $P_0 e^{-\alpha L}$. It is, thus, apparent that for the unclad fiber, and for other large index-difference fibers, the intersymbol interference could be extremely bad in the absence of the corrective means now to be considered.

It can be shown that for any arbitrary signal, having an intensity function $P(t)$, applied at the input of the fiber, the received signal intensity $R(t)$ is given by $$R(t) = P(t)e^{-\alpha L} + \alpha v S e^{-\alpha L} e^{-\alpha v t} \int_{-\infty}^{t} e^{\alpha v t'} P(t') dt' \quad (17)$$

where $v$ is the velocity of propagation of the signal along the fiber.

While the lower limit on the integral should actually be $$t - \frac{2L}{v}$$

for values of $\alpha L$ and $\alpha v$ of interest, the lower integration limit $$t - \frac{2L}{v}$$

can be replaced by $-\infty$ without significant loss of accuracy.

It will be noted that Equation 17 includes two terms. The first, $P(t)e^{-\alpha L}$ is simply the attenuated input signal. The second term, on the other hand, is a spurious component introduced by the double-reverse scattering. It will be further noted that except for a difference in scale, the DRS component is identical in form to the output $E(t)$ one would obtain from an R-C integrating circuit, for the same input signal $P(t)$. That is $$E(t) = \frac{1}{RC} e^{-\frac{t}{RC}} \int_{-\infty}^{t} e^{-\frac{t'}{RC}} P(t') dt' \quad (18)$$

Thus, knowing that the DRS response of the transmission line is the equivalent of an R-C integrator, a correction signal can be locally generated at the receiver, and then used to cancel the DRS component. In particular, if the RC product of the integrating circuit is chosen such that $$RC = \frac{1}{\alpha v} \quad (19)$$

the response of the R-C integrator circuit (except for a scale factor) is identical to the DRS response of the light fiber for the same input signal $P(t)$. Thus, in accordance with the present invention, an equalizer circuit, including an R-C integrator, is provided at the receiver for locally generating a correction signal which is used to cancel the error component in the received signal.

A first illustrative arrangement of the invention is illustrated in FIG. 3, which shows a receiver 30 comprising, in cascade, a photodetector 31, an amplifier 32, and an equalizer circuit 39. The latter includes a signal divider 33, an R-C integrator 35, and a signal combiner 34.

In operation, photodetector 31 produces an output signal that is proportional to the intensity of the input optical signal. The detected signal is then amplified, and the amplified signal coupled to signal divider 33 wherein it is divided into two portions. The first portion, designated the main signal portion, is coupled to signal combiner 34 through a time delay network 36. The second portion is coupled to R-C integrator 35. The output from the integrator is then injected back into the main signal wavepath, by means of signal combiner 34, in time coincidence with the main signal portion, and in such polarity and amplitude as to cancel the DRS error component in the main signal.

Designating input signal to port 1 of signal divider 33 as $R(t)$, the main signal portion $r(t)$ at port 3, and coupled portion $r'(t)$ at port 4 are given by $$r(t) = k_{13}R(t) \quad (20)$$

and $$r'(t) = k_{14}R(t) \quad (21)$$

where $k_{13}$ and $k_{14}$ are the coupling coefficients between the respective ports of signal divider 33. In terms of Equation 17, these two signal portions are given as $$r(t) = K_1 P(t) + K_2 e^{-\alpha v t} \int_{-\infty}^{t} e^{\alpha v t'} P(t') dt' \quad (22)$$

and $$r'(t) = K_3 P(t) + K_4 e^{-\alpha v t} \int_{-\infty}^{t} e^{\alpha v t'} P(t') dt' \quad (23)$$

where $$K_1 = k_{13} e^{-\alpha L} \quad (24)$$
$$K_2 = k_{13} \alpha v S e^{-\alpha L} \quad (25)$$
$$K_3 = k_{14} e^{-\alpha L} \quad (26)$$
$$K_4 = k_{14} \alpha v S e^{-\alpha L} \quad (27)$$

The main signal portion $r(t)$ is coupled to port 3 of signal combiner 34 to produce a time delayed output signal component $E(t)$ at port 1 given by $$E(t) = k_{31} r(t) \quad (28)$$

where $k_{31}$ is the coupling coefficient between ports 3 and 1 of signal combiner 34. Substituting from Equation 22 for $r(t)$, we obtain $$E(t) = k_{311} K P(t) + k_{31} K_2 e^{-\alpha v t} \int_{-\infty}^{t} e^{\alpha v t'} P(t') dt' \quad (29)$$

The coupled signal portion $r'(t)$ is applied to R–C integrator 35, and produces an output signal $v(t)$ given by $$v(t) = \frac{1}{RC} e^{-\frac{t}{RC}} \int_{-\infty}^{t} e^{\frac{t'}{RC}} r'(t') dt' \quad (30)$$

Substituting for RC from Equation 19 and for $r'(t)$ from Equation 23, we obtain for $v(t)$ $$v(t) = K_3 \alpha v e^{-\alpha v t} \int_{-\infty}^{t} e^{\alpha v t'} P(t') dt'$$
$$+ K_4 (\alpha v) e^{-\alpha v t} \int_{-\infty}^{t} \int_{-\infty}^{t'} e^{\alpha v t''} P(t'') dt'' dt' \quad (31)$$

Signal $v(t)$ is then coupled to port 4 of signal combiner 34, to produce a signal $$E'(t) = k_{41} v(t) \quad (32)$$

in output port 1, where $k_{41}$ is the coupling coefficient between ports 4 and 1.

The net output signal $E_0(t)$ is the difference of the two signal components given by Equations 29 and 32. That is $$E_0(t) = E(t) - E'(t) \quad (33)$$

In particular, the parameters of the equalizer are proportioned such that $$K_3 k_{41} \alpha v = K_2 k_{31} \quad (34)$$

For this case, the first term of Equation 31 and the second term of Equation 29 are equal, and Equation 33 reduces to $$E_0(t) = k_{31} K_1 P(t)$$
$$+ K_4 k_{41} (\alpha v) e^{-\alpha v t} \int_{-\infty}^{t} \int_{-\infty}^{t'} e^{\alpha v t''} P(t'') dt'' dt' \quad (35)$$

It will be noted from Equation 35 that the output signal includes a component proportional to the desired signal $P(t)$ and that the DRS component has been canceled. However, the latter has been replaced by a different spurious component given by the second term of Equation 35. This component is present because the input to the equalizer circuit includes both a component proportional to the input signal $P(t)$ and a component proportional to the DRS signal. The signal component, upon integration, is used to cancel the DRS component in the main signal. The DRS component, upon integration, has nothing to operate against in the main signal, and appears at the output as a spurious component.

It is apparent that the substitution of one spurious signal for another spurious signal would be pointless unless the substituted spurious signal was significantly smaller than the original spurious signal. In this connection, it can be shown that the spurious component in Equation 35 is indeed less than the DRS component given by Equation 17 when the parameter S is less than ⅔. That is, signal equalization, in accordance with the present invention, results in a reduction in the spurious component produced by double-reverse scattering when $$S < \tfrac{2}{3} \quad (36)$$

Since S was of the order of 0.1 for the example given hereinabove, the spurious component of the signal is correspondingly reduced.

Substituting for $K_2$ and $K_3$ from Equations 25 and 26 in Equation 34, the condition defined by Equation 36 is given in terms of the coupler parameters as $$S = \frac{k_{13} k_{31}}{k_{14} k_{41}} < 2/3 \quad (37)$$

Figure 4:
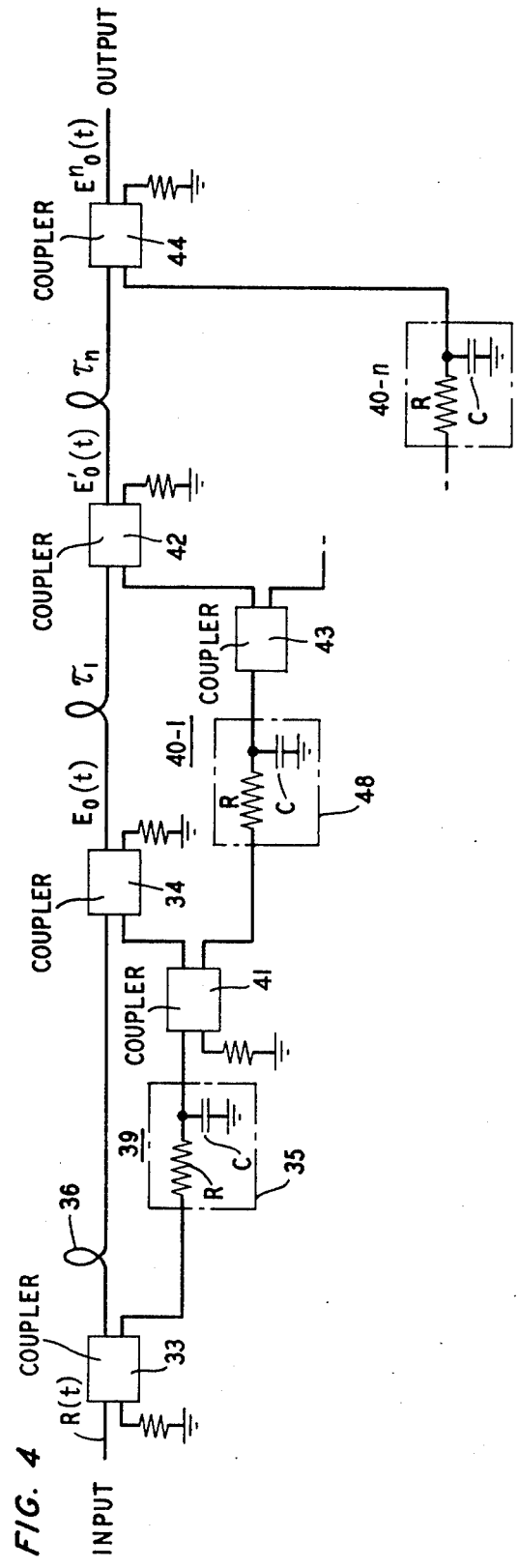

If, for some particular application, the spurious component after equalization is still too large to meet system performance requirements, a further reduction can be realized by the iterative arrangement of R–C equalizers shown in FIG. 4.

In the embodiment of FIG. 4 equalizer 39 operates upon the input signal $R(t)$, as described in connection with FIG. 3, to produce the corrected signal $E_0(t)$. If, however, a further reduction in the magnitude of the spurious component associated with $E_0(t)$ is required, a second equalization stage 40–1 having the same R–C product is added. This stage extracts a portion of the output signal from integrator 35 by means of a coupler 41 and passes it through a second R–C integrator 48 in equalizer stage 40–1. The output from integrator 48 is then injected back into the main signal path by means of a coupler 42. The signal amplitudes and polarity are such that the signal injected by coupler 42 cancels the spurious component of signal $E_0(t)$, but introduces a different, smaller component to produce a different signal $E_0'(t)$. If a further reduction is required, the process is continued, producing finally, the output signal $E_0^n(t)$.

It can readily be shown that for any arbitrary $n$, the spurious component in the output signal $E_0^n(t)$ is reduced by at least a factor $(\tfrac{3}{2}S)^n$ relative to the spurious signal component given by the second term of Equation 35. That is, each additional order of equalization reduces the interference term by at least a factor of ¾ S. Thus, the interference produced by the spurious component in the output signal can be rendered arbitrarily small by using enough stages of equalization. In practice there will be some limit to the precision of achievable equalization due to the random nature of the scattering. Statistical considerations have shown, however, that these effects are quite small.

It will be recognized that the particular relationships defined above are descriptive of the specific embodiment disclosed. If, for example, amplifiers are added to either the equalizer stage or along the main signal path, the coupling coefficients will be modified accordingly to produce the requisite signal cancellation. Thus, in all cases, it is understood that the above-described arrangements are illustrative of but a small number of the many possible specific embodiments which can represent applications of the principles of the invention. Numerous and varied other arrangements can readily be devised in accordance with these principles by those skilled in the art without departing from the spirit and scope of the invention.

We claim:

1. In a communication system including a dielectric waveguide as a transmission link, a receiver comprising:
    a signal detector;
    and an equalizer;
    said equalizer including:
        means for dividing the output signal from said detector into two signal components;
        an R-C integrator;
        means for coupling one of said signal components to said integrator;
        and means for combining the output from said integrator in time coincidence with the other of said signal components so as to minimize the magnitude of any double-reverse scattered signal produced by said transmission link.

2. The receiver according to claim 1 wherein said waveguide is an optical fiber.

3. The receiver according to claim 1 wherein the RC product of said integrator is approximately equal to $1/v\alpha$, where $\alpha$ is the attenuation coefficient per unit length of said waveguide and $v$ is the velocity of signal propagation along said waveguide.

4. The receiver according to claim 1 wherein said equalizer includes a plurality of cascaded R-C integrators;
    and wherein the output of each of said integrators is divided into two portions, one of which is combined with said other signal component and the other of which is coupled to the next adjacent integrator.

5. In an optical communication system including an optical fiber transmission link between a transmitter and a receiver, said receiver including:
    a photodetector;
    means for amplifying the output signal from said detector;
    and an equalizer;
    said equalizer comprising:
        a signal divider for dividing the amplified signal from said amplifying means into two signal components;
        an R-C integrator;
        means for coupling one of said signal components to said integrator;
        and means for combining the output from said integrator in time coincidence with the other of said signal components to minimize the magnitude of the double-reverse scattered signal produced in said optical fiber.

References Cited

UNITED STATES PATENTS

| | | | |
|---|---|---|---|
| 3,444,468 | 5/1969 | Droukhet, Jr. et al. | 325—42 |
| 3,283,063 | 11/1966 | Kawashima, et al. | 325—65 |
| 3,465,156 | 9/1969 | Peters | 250—199 |
| 3,331,027 | 7/1967 | Szekely | 325—65 |

ALBERT J. MAYER, Primary Examiner

U.S. Cl. X.R.

325—42, 65, 475, 476, 324; 350—96 R